(No Model.)  2 Sheets—Sheet 1.

R. S. PEASE.
SPORTING TRAP.

No. 480,130. Patented Aug. 2, 1892.

WITNESSES:
James F. Duhamel
Horace A. Dodge.

Roger S. Pease, INVENTOR
by Dodge & Sons, Attys (No Model.) 2 Sheets—Sheet 2.

R. S. PEASE.
SPORTING TRAP.

No. 480,130. Patented Aug. 2, 1892.

WITNESSES:
James F. Duhamel
Horace A. Dodge.

Roger S. Pease,
INVENTOR
by Dodge Sons,
Attys.

UNITED STATES PATENT OFFICE.

ROGER S. PEASE, OF ROSE, MINNESOTA.

SPORTING-TRAP.

SPECIFICATION forming part of Letters Patent No. 480,130, dated August 2, 1892.

Application filed June 4, 1891. Serial No. 395,111. (No model.)

*To all whom it may concern:*

Be it known that I, ROGER S. PEASE, a citizen of the United States, residing at Rose, in the county of Ramsey and State of Minnesota, but having my place of business in Minneapolis, Minnesota, have invented certain new and useful Improvements in Sporting-Traps, of which the following is a specification.

My invention relates to bird-traps, or to that variety of traps employed in "trap-shooting," and designed to liberate the bird which serves as the target for sportsmen.

The objects sought to be accomplished by this invention are to keep the sportsmen in ignorance as to the probable direction of flight, to insure the prompt and vigorous flight of the bird when the trap is sprung or opened, and to protect the trap against injury by the projectiles used.

Figure 1:
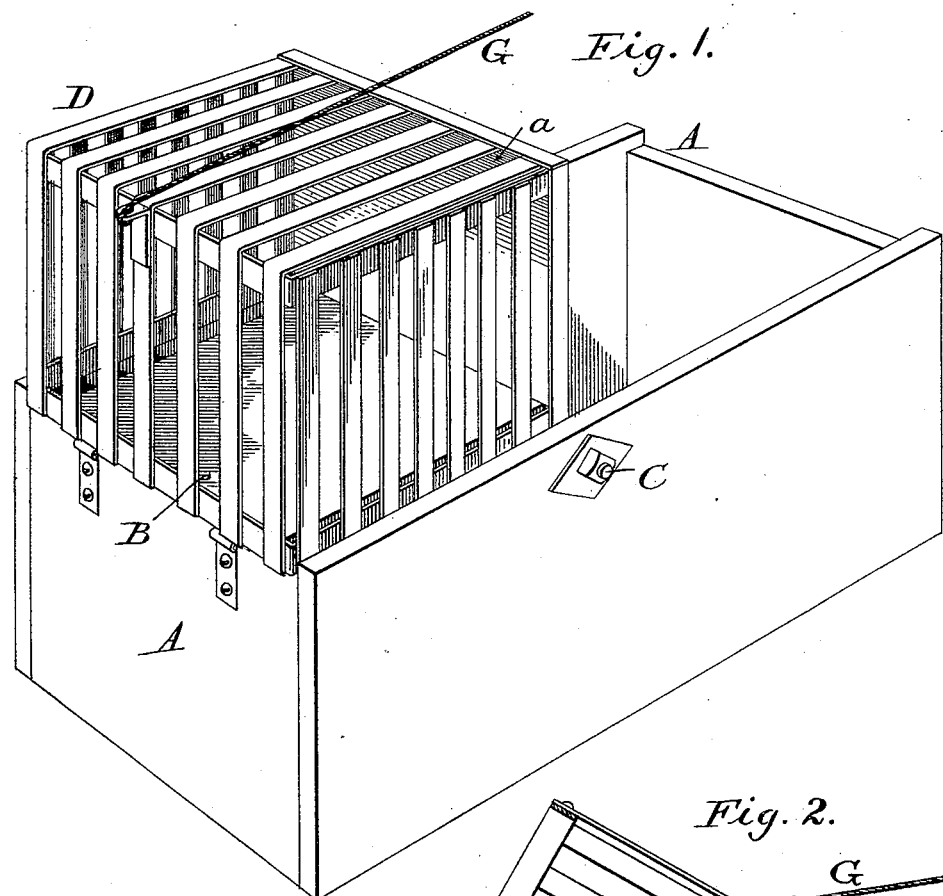
Figure 2:
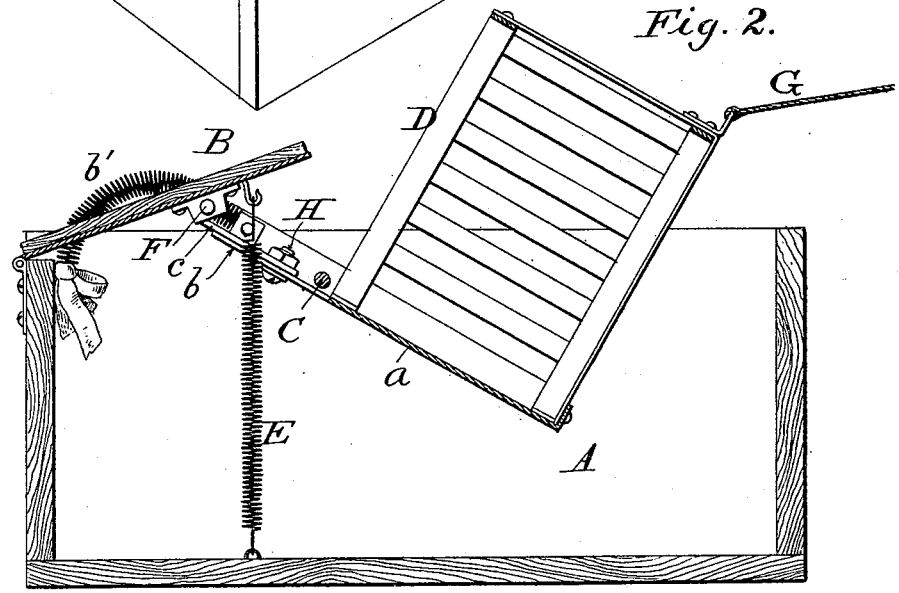

In the accompanying drawings, Figure 1 is a perspective view of my trap complete, showing the cage in position to retain the bird; Fig. 2, a longitudinal sectional view showing the parts in the positions they take as the trap is sprung, and Fig. 3 a perspective view showing the trap buried flush with the surface of the ground and sprung.

In constructing my improved trap I first provide a box A, which may be conveniently made of two feet in length and one foot in width and depth, or thereabout, for pigeons, and of such other dimensions as may be found desirable for the particular purpose for which the trap is intended. This box may be, and preferably will be, buried in the ground, so that its upper edges shall be flush or about flush with the surface, so that when the trap is sprung and the bird released no portion of the trap proper shall be exposed to the shot or other projectiles used and that there shall be consequently no danger of injury.

Figure 3:
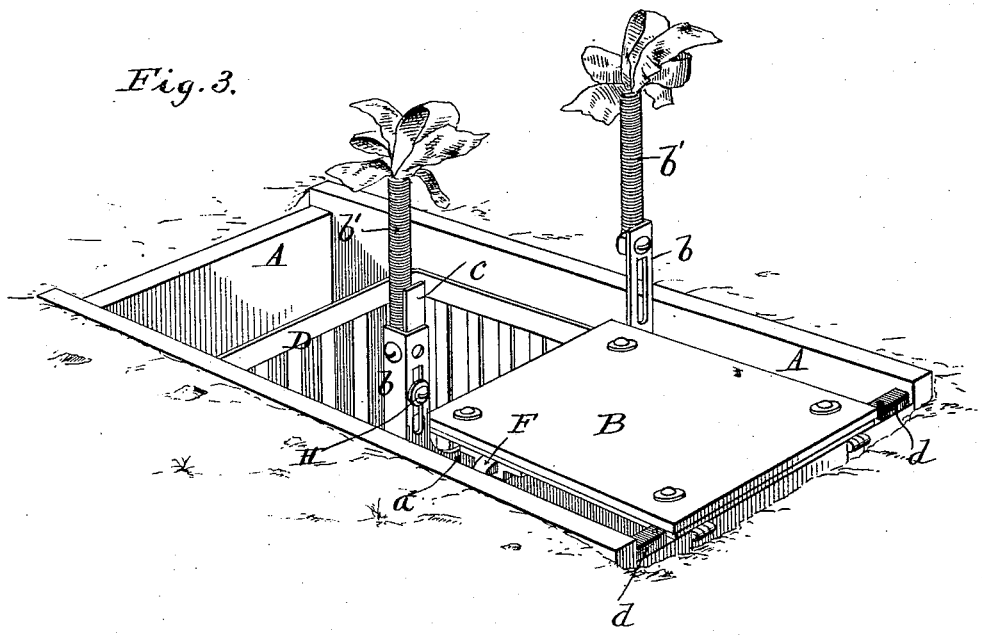

Hinged or jointed to one end of the box A is a platform B, which extends inward over the open box at or near the level of its upper edges, and which normally occupies a horizontal position, its inner or free end resting upon a cross-rod C, extending from one side of the box to the other and constituting a pivot or supporting-rod for the cage D, which may be swung upward over the platform B, as shown in Fig. 1, or downward into the box A, as shown in Fig. 3, the action or movement of the parts being illustrated in Fig. 2.

The cage D is advisedly made of metal, sheet-iron and hoop-iron serving very well for the purpose; but I do not restrict myself to the use of any particular materials, as the cage may obviously be made of wood or any other suitable material. The rear wall $a$ of the cage D, I prefer to make close or tight, so as to serve as a screen to hide the bird within the cage from the sportsman, thereby preventing him from ascertaining in advance the direction or probable flight of the bird, and consequently rendering the shooting more difficult. The remaining sides and the top I prefer to make of narrow strips or of other suitable form of open-work in order that the bird may see out and ascertain its bearings before the trap is sprung, and so, also, that it may not be dazed by being suddenly exposed to the bright light after being for a time kept in darkness.

From a long experience in trap-shooting I have become convinced that the failure of birds to fly promptly upon the springing of the trap is due to the blinding effect of a strong light to which the bird's eyes are suddenly exposed and to its ignorance of its surroundings and the consequent time required to get its bearings preparatory to flight. Both of these difficulties I overcome by making the body of the cage of open-work, a result which may obviously be secured, at least in part, by forming windows or openings in otherwise solid walls.

The platform B is normally drawn and held down with its free edge resting upon the cross-bar C by means of a spiral spring E, one end of which is attached to the under side of said platform, while the other end is attached to some convenient portion of the box, preferably the box bottom. From one side of the platform B projects a spring-bolt F, the protuding end of which is beveled on the upper side, as shown in Fig. 3. Projecting downward from the rear wall $a$ of the cage, or it may be from the side walls thereof, are arms $b$, one of which rides over the beveled end of the bolt F as the cage is raised to the position shown in Fig. 1 and forces said bolt inward until the arm passes said bolt and swings down to a vertical or substantially vertical position.

Attached to the front of the cage D at its upper side or at other convenient point is a cord G, which will be of convenient length to extend to the point from which the trap is to be sprung, and by which the cage may be thrown over backward to the position shown in Fig. 3. The manner and effect of thus throwing over the cage is well illustrated in Fig. 2, where it will be seen that as the cage thus falls backward one of the arms *b* or an adjustable plate *c*, carried by said arm, striking the under side of bolt F, raises said bolt, and consequently the platform B, to the position shown in Fig. 2 or slightly above said position, the elevation depending upon the adjustment of the plate *c*. To permit such adjustment, the arm *b* is slotted, as shown in Fig. 3, and the plate *c* is clamped to said arm by a bolt H passing through the slot of arm *b* and provided with a suitable nut, by loosening which nut the bolt may be moved inward or outward, as required, and by tightening which the plate will be secured in position. The purpose of thus elevating the platform B is to cause the bird to fly the instant it is free to do so, and this result is the more certainly produced by reason of the sudden drop of the platform from beneath the bird at the moment that the plate *c* rides out from under the end of bolt F, which it does when the cage passes well off from over the platform.

In the practical use of other traps I have observed that where they are provided with metal floors or platforms the bird not unfrequently slips thereon by reason of its inability to get proper foothold, and that as a consequence there is a failure to fly promptly. I therefore roughen the platform B in any suitable manner, preferably facing the same with or making it of rough or unplaned board, as indicated in the several figures.

When the cage is swung upward over the platform, as shown in Fig. 1, its edges rest upon the end wall of the box A, and to prevent undue wear elastic bearing-blocks *d* are provided for the cage to rest upon.

As a further means of insuring the prompt flight of the bird the arms *b* have secured to them flexible extensions *b'*, which are preferably made in the form of spiral springs and are furnished at their free ends with small flags, bits of ribbon, or other bright-colored material, which waving rapidly back and forth by reason of the sudden throw imparted to the arms in tipping the cage are well calculated to frighten the bird and cause it to fly. This vibratory motion may be maintained as long as desired by simply continuing to jerk or pull the string.

It will be seen that without departing from the spirit of my invention the details of the structure may be more or less modified—as, for instance, by dispensing with the spring E and permitting the platform B to return to its normal position by gravity. So, too, the adjustable plate *c* may be omitted and the arm *b* be arranged to engage directly with the bolt F, or the rigid arm may be formed upon the platform and the yielding bolt applied to arm *b*. So, also, the box A may be placed above ground, or may be cut away to form simply a skeleton frame. These and like modifications will readily suggest themselves to the mechanic and sportsman and do not affect the substance of the invention.

No claim is made, broadly, to a cage hinged to a base or platform and adapted to swing to and from a position over said platform; but, so far as I am aware, no one has hitherto constructed a trap with a box or frame to receive the cage when thrown back, nor to be buried in the ground out of reach of the shot of the sportsman. Hence such combination is claimed by me.

Having thus described my invention, what I claim is—

1. The herein-described trap, consisting of box or frame A, platform B, and cage D, said cage being adapted to move to and from a position over the platform.

2. In a trap, the combination of a platform at or about the level of the ground, a cage adapted to move to and from a position over said platform, and a box or pit below the surface of the ground to receive the cage when removed from over the platform.

3. In combination with a box or frame A, a platform B, hinged or jointed thereto, a cage D, hinged or pivoted in said box or frame and adapted to swing over the platform B, and an arm carried by one of said hinged parts and adapted to engage with a projection upon the other hinged part, whereby the platform B is lifted as the cage is thrown back from over the platform.

4. In combination with box or frame A, tipping platform B, provided with bolt F, and tipping cage D, provided with adjustable arm *b*.

5. The combination, in a sporting-trap, of a roughened platform and a cage movable to and from a position over said platform.

6. In a sporting-trap, the combination of a supporting-frame, a cage mounted in said frame and adapted to be moved from over the bird, and a flexible arm carried by said cage and adapted to vibrate near the bird when the cage is thrown back.

7. In combination with tipping cage D, flexible arm *b'*, provided with bits of ribbon or bright material.

8. In a sporting-trap, a cage to inclose the bird, having the side toward the sportsman closed to prevent the bird from being seen and provided elsewhere with openings to admit light.

9. In a sporting-trap, a cage having the side toward the sportsman closed and the remaining sides provided with openings, whereby the bird is hidden from the sportsman, but is enabled to get its bearings before the trap is sprung.

10. The herein-described sporting-trap, consisting of box or frame A, platform B, hinged to said box or frame, cross-rod C, extending beneath the free end of the platform, cage D, pivoted upon said rod, spring E, attached to the platform and to the box or frame, arm b, projecting from the cage and serving to lift the platform, and flexible extensions b', carrying bits of bright material, all substantially as described and shown.

11. In a sporting-trap, the combination of a cage and a vibratory arm adapted to be set in motion by the retraction or removal of the cage for the purpose of frightening the bird and causing it to fly promptly.

In witness whereof I hereunto set my hand in the presence of two witnesses.

ROGER S. PEASE.

Witnesses:
S. E. BIBBINS,
M. S. EVERTS.